US012574696B2

(12) United States Patent
Arteaga et al.

(10) Patent No.:  US 12,574,696 B2
(45) Date of Patent:  Mar. 10, 2026

(54) METHOD AND APPARATUS FOR GENERATING AN INTERMEDIATE AUDIO FORMAT FROM AN INPUT MULTICHANNEL AUDIO SIGNAL

(71) Applicant: DOLBY INTERNATIONAL AB, Dublin (IE)

(72) Inventors: Daniel Arteaga, Barcelona (ES); Jordi Pons Puig, Olot (ES)

(73) Assignee: DOLBY INTERNATIONAL AB, Dublin (IE)

( * ) Notice: Subject to any disclaimer, the term of this patent is extended or adjusted under 35 U.S.C. 154(b) by 209 days.

(21) Appl. No.: 18/247,600

(22) PCT Filed: Oct. 14, 2021

(86) PCT No.: PCT/EP2021/078444

§ 371 (c)(1),
(2) Date: Mar. 31, 2023

(87) PCT Pub. No.: WO2022/079165

PCT Pub. Date: Apr. 21, 2022

(65) Prior Publication Data

US 2024/0022868 A1     Jan. 18, 2024

Related U.S. Application Data

(60) Provisional application No. 63/136,694, filed on Jan. 13, 2021.

(30) Foreign Application Priority Data

Oct. 17, 2020   (ES) ................................ P202031054
Jan. 6, 2021    (EP) .................................... 21150392

(51) Int. Cl.
*H04S 3/00*  (2006.01)
*G06N 20/00*  (2019.01)
*H04S 7/00*  (2006.01)

(52) U.S. Cl.
CPC ............. *H04S 3/008* (2013.01); *G06N 20/00* (2019.01); *H04S 7/302* (2013.01); *H04S 2400/01* (2013.01); *H04S 2400/11* (2013.01)

(58) Field of Classification Search
CPC ... H04S 3/008; H04S 2400/11; H04S 2400/01
See application file for complete search history.

(56) References Cited

U.S. PATENT DOCUMENTS 9,602,940 B2    3/2017  Bharitkar
9,805,725 B2    10/2017  Crockett
(Continued)

FOREIGN PATENT DOCUMENTS

EP        3440671 B1    2/2020
EP        3257269 B1    11/2020
(Continued)

OTHER PUBLICATIONS

O. Ronneberger, P. Fischer, and T. Brox, "U-net: Convolutional networks for biomedical image segmentation," in International Conference on Medical image computing and computer-assisted intervention. Springer, 2015, pp. 234-241.
(Continued)

*Primary Examiner* — James K Mooney

(57)         ABSTRACT

Described herein is a method for training a machine learning algorithm. The method may comprise receiving a first input multichannel audio signal. The method may comprise generating, using the machine learning algorithm, an intermediate audio signal based on the first input multichannel audio signal. The method may comprise rendering the intermediate audio signal into a first output multichannel audio signal.
(Continued)

Further, the method may comprise improving the machine learning algorithm based on a difference between the first input multichannel audio signal and the first output multichannel audio signal. Described herein are further an apparatus for generating an intermediate audio format from an input multichannel audio signal as well as a respective computer program product comprising a computer-readable storage medium with instructions adapted to carry out said method when executed by a device having processing capability.

20 Claims, 5 Drawing Sheets

(56)                    References Cited

U.S. PATENT DOCUMENTS

| | | | |
|---|---|---|---|
| 9,866,984 | B2 | 1/2018 | Kim |
| 9,875,747 | B1 | 1/2018 | Kim |
| 9,947,338 | B1 | 4/2018 | Koteshwara |
| 10,341,785 | B2 | 7/2019 | Barker |
| 10,419,867 | B2 | 9/2019 | Seo |
| 2009/0238371 | A1 | 9/2009 | Rumsey |
| 2015/0243289 | A1 | 8/2015 | Radhakrishnan |
| 2016/0267914 | A1* | 9/2016 | Hu ......................... H04S 3/008 |
| 2018/0233156 | A1 | 8/2018 | Breebaart |
| 2019/0191258 | A1 | 6/2019 | Lando |
| 2019/0259409 | A1 | 8/2019 | Ehsan |
| 2019/0392802 | A1 | 12/2019 | Higurashi |
| 2020/0042285 | A1 | 2/2020 | Choi |
| 2020/0322743 | A1 | 10/2020 | Cengarle |
| 2022/0021997 | A1* | 1/2022 | Morales ................... G06N 3/04 |
| 2023/0300557 | A1* | 9/2023 | Honma .................... G06N 3/08 |
| | | | 381/300 |

FOREIGN PATENT DOCUMENTS

| | | | |
|---|---|---|---|
| EP | 3570566 | B1 | 12/2022 |
| WO | 2017035281 | A2 | 3/2017 |
| WO | 2017207465 | A1 | 12/2017 |
| WO | 2019027812 | A1 | 2/2019 |
| WO | 2019229199 | A1 | 12/2019 |

OTHER PUBLICATIONS

Zhang Shuang et al: "Sparse Autoencoder Based Multiple Audio Objects Coding Method", AES Convention 146, Mar. 2019.

Arteaga et al: "Multichannel-based learning for audio object extraction", arxiv.org, Feb. 11, 2021, pp. 1-5.

Paulus et al: "Source Separation for Enabling Dialogue Enhancement in Object-based Broadcast with MPEG-H", Journal of the Audio Engineering Society, vol. 67, No. 7/8, Jul. 6, 2019, pp. 510-521.

* cited by examiner

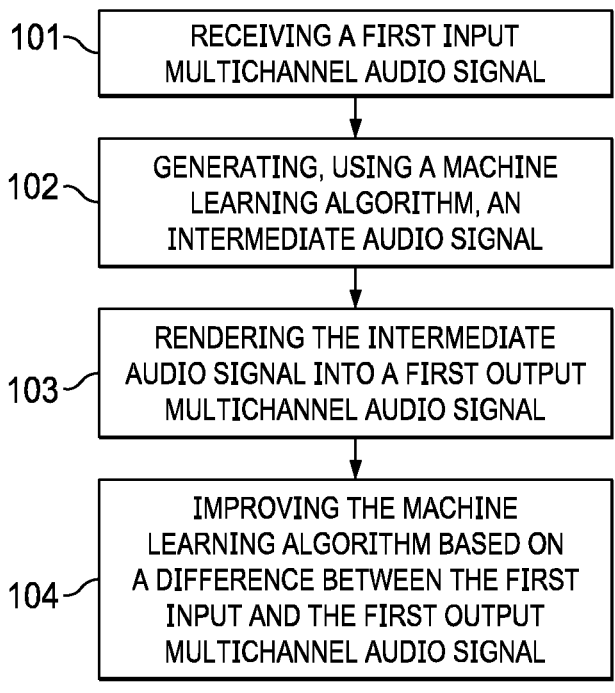

101 — RECEIVING A FIRST INPUT MULTICHANNEL AUDIO SIGNAL

102 — GENERATING, USING A MACHINE LEARNING ALGORITHM, AN INTERMEDIATE AUDIO SIGNAL

103 — RENDERING THE INTERMEDIATE AUDIO SIGNAL INTO A FIRST OUTPUT MULTICHANNEL AUDIO SIGNAL

104 — IMPROVING THE MACHINE LEARNING ALGORITHM BASED ON A DIFFERENCE BETWEEN THE FIRST INPUT AND THE FIRST OUTPUT MULTICHANNEL AUDIO SIGNAL

FIG. 1

201 — RECEIVING A REFERENCE INTERMEDIATE AUDIO SIGNAL

202 — RENDERING THE REFERENCE INTERMEDIATE AUDIO SIGNAL INTO A FIRST INPUT MULTICHANNEL AUDIO SIGNAL

203 — GENERATING, USING A MACHINE LEARNING ALGORITHM, AN INTERMEDIATE AUDIO SIGNAL

204 — RENDERING THE INTERMEDIATE AUDIO SIGNAL INTO A FIRST OUTPUT MULTICHANNEL AUDIO SIGAL

205 — IMPROVING THE MACHINE LEARNING ALGORITHM BASED ON A DIFFERENCE BETWEEN THE FIRST INPUT MULTICHANNEL AUDIO SIGNAL AND THE FIRST OUTPUT MULTICHANNEL AUDIO SIGNAL

FIG. 2

METHOD AND APPARATUS FOR GENERATING AN INTERMEDIATE AUDIO FORMAT FROM AN INPUT MULTICHANNEL AUDIO SIGNAL

CROSS-REFERENCE TO RELATED APPLICATION

This application is a U.S. National Stage of International Application No. PCT/BP2021/078444, filed Oct. 14, 2021, which claims priority of the following priority applications: ES application P202031054, filed 17 Oct. 2020, EP Application Serial No. 21150392.5, filed 6 Jan. 2021, and U.S. provisional application 63/136,694, filed 13 Jan. 2021, each of which is hereby incorporated by reference in its entirety.

TECHNOLOGY

The present disclosure relates generally to methods and apparatus for generating an intermediate audio format (such as, for example, a Dolby® Atmos™ audio format) from an input multichannel audio signal, and more specifically to generating audio objects with audio tracks and position metadata from e.g. 2.0, 3.1, 5.1 or 7.1 multichannel audio signals.

While some embodiments will be described herein with particular reference to that disclosure, it is will be appreciated that the present disclosure is not limited to such a field of use and is applicable in broader contexts.

BACKGROUND

Any discussion of the background art throughout the disclosure should in no way be considered as an admission that such art is widely known or forms part of common general knowledge in the field.

Dolby® Atmos™ technology allows up to 128 audio tracks plus associated spatial audio description metadata for optimal, dynamic rendering to theatre loudspeakers. In order to render traditional, channel-based audio sources on a Dolby® Atmos™ system, said audio tracks and spatial metadata need to be extracted from the respective legacy multi-channel audio format. This problem is denoted as source separation within this document.

Methods known from the prior art are capable of extracting audio objects out of a 5.1 multichannel audio mix. However, known methods typically suffer from a series of limitations including lack of convergence, lack of time continuity and problematic separation for close objects.

More recent approaches are based on supervised and unsupervised learning problems which benefited from the rapid rise in deep learning. In general, deep neural networks (DNNs) have been shown to greatly improve the solutions of supervised learning problems. Types of DNNs include feedforward multilayer perceptrons (MLP), convolutional neural networks (CNNs), recurrent neural networks (RNNs), and generative adversarial networks (GANs). Among these, CNNs are a class of feedforward networks.

It is an object of the present document to provide a novel method and apparatus for automatically extracting audio objects from a traditional multichannel audio signal using deep learning techniques.

SUMMARY

In accordance with a first aspect of the present disclosure, there is provided a method for training a machine learning algorithm. The method may include receiving a first input multichannel audio signal. The method may further include generating, using the machine learning algorithm, an intermediate audio signal based on the first input multichannel audio signal. The method may further include rendering the intermediate audio signal into a first output multichannel audio signal. Further, the method may include improving the machine learning algorithm based on a difference between the first input multichannel audio signal and the first output multichannel audio signal.

The machine learning algorithm may undergo an iterative training such that the performance of the machine learning algorithm is iteratively improved or even optimized with regard to a certain criterion. To this end, a plurality of first input multichannel audio signals may be used as training data.

Receiving the first input multichannel audio signal may include receiving a reference intermediate audio signal, and rendering the reference intermediate audio signal into the first input multichannel audio signal. Thus, instead of directly comparing the generated intermediate audio signal with the reference intermediate audio signal, the latter signals are compared indirectly based on the difference between the rendered first input multichannel audio signal and the rendered first output multichannel audio signal.

The reference intermediate audio signal may have the same format as the intermediate audio signal.

The first input multichannel audio signal may have the same format as the first output multichannel audio signal. For instance, both may be multichannel audio signals obtained by rendering to a predefined channel layout.

Improving the machine learning algorithm may include comparing the first input multichannel audio signal and the first output multichannel audio signal using a loss function. In other words, the difference between the first input multichannel audio signal and the first output multichannel audio signal may be evaluated using a loss function which is e.g. based on a mean squared error.

The intermediate audio signal may include one or more audio objects, wherein each of the audio objects includes an audio track and position metadata. The position metadata may include a position (location) of the respective audio object, such as in the form of a coordinate vector. For example, the intermediate audio format may include a Dolby® Atmos™ format. Alternatively, the intermediate audio format may include an Ambisonics audio format (e.g., a first-order or higher-order Ambisonics audio format).

Similarly, the reference intermediate audio signal may include one or more audio objects, wherein each of the audio objects includes an audio track and position metadata. The number of audio objects of the reference intermediate audio signal may be larger than the number of audio objects of the intermediate audio signal. Thus, it becomes evident that the above-described indirect comparison of rendered layouts is advantageous since it is difficult to compare two (different) sets of audio objects, possibly with different numbers of audio objects in the sets. In particular, it is difficult to decide (a) which audio objects are compared and (b) in which order the audio objects are compared.

The intermediate audio signal may further include a bed channel residual, wherein the bed channel residual is a multichannel audio signal having the same format as the first input multichannel audio signal. Moreover, the reference intermediate audio signal may also include a bed channel, wherein the bed channel is a multichannel audio signal having the same format as the input multichannel audio signal.

The first input multichannel audio signal may include a 2.0, 3.1, 5.1 or 7.1 multichannel audio signal, and the first output multichannel audio signal may comprise a 2.0, 3.1, 5.1, 7.1, 9.1, 5.1.2, 7.1.4, or 9.1.6 multichannel audio signal. In some implementations, the first input multichannel audio signal may additionally or alternatively include a 5.1.2, 7.1.4, or 9.1.6 multichannel audio signal.

The method may further include rendering a second input multichannel audio signal from the reference intermediate audio signal. The method may further include rendering the intermediate audio signal into a second output multichannel audio signal. This may amount to rendering the intermediate audio signal to a predefined speaker layout, such as any of the predefined speaker layouts mentioned above. And, the method may further include improving the machine learning algorithm based on a first difference between the first input multichannel audio signal and the first output multichannel audio signal, and based on a second difference between the second input multichannel audio signal and the second output multichannel audio signal. Again, the second input multichannel audio signal may have the same format as the second output multichannel audio signal. In general, a plurality of N input/output signal pairs may be compared, and the obtained differences may be weighted to obtain an overall difference which is subsequently used to further improve the machine learning algorithm.

Generating the intermediate audio signal using the machine learning algorithm may further include generating, using the machine learning algorithm, a multichannel object based on the first input multichannel audio signal, and determining, using a de-panning algorithm, position meta data of an audio object of the intermediate audio signal based on the multichannel object. Here, the multichannel audio object may relate to an audio track of an audio object that is present in (e.g., panned to) multiple audio channels. The de-panning algorithm may be based on a further machine learning algorithm, and the method may further include jointly improving the de-panning algorithm and the machine learning algorithm based on the difference between the first input multichannel audio signal and the first output multichannel audio signal.

The machine learning algorithm may include (or be implemented by) a deep neural network. In particular, the machine learning algorithm may include a combination of a deep neural network and a digital signal processing algorithm.

The comparing of the first input multichannel audio signal and the first output multichannel audio signal may be performed in the waveform domain or in the spectral domain (e.g., spectrogram domain). The comparing of the first input multichannel audio signal and the first output multichannel audio signal may involve at least one of: a mean squared error, a mean absolute error, and a mean squared logarithmic error. That is, different loss functions may be used.

Improving the machine learning algorithm may further include minimizing a cost function term involving a position, a motion, or an acceleration of an audio object. The position, motion, or acceleration of the audio object may be described in the position metadata or derivable from the position metadata. The cost function term may implement one or more penalties for predefined conditions. Furthermore, improving the machine learning algorithm may further include minimizing a cost function term involving a correlation between audio tracks of two different audio objects and/or between the audio track of an audio object and the bed channel residual. Thereby, certain trivial and undesired outputs of the machine learning algorithm can be avoided.

In accordance with a second aspect of the present disclosure, there is provided an apparatus for generating an intermediate audio format from an input multichannel audio signal, wherein the apparatus includes a processor configured to perform some or all of the steps of the above-described method.

In accordance with a third aspect of the present disclosure, there is provided a computer program product comprising a computer-readable storage medium with instructions adapted to cause the device to carry out some or all of the steps of the above-described method when executed by a device having processing capability.

BRIEF DESCRIPTION OF THE DRAWINGS

Example embodiments of the disclosure will now be described, by way of example only, with reference to the accompanying drawings in which:

FIG. 1 illustrates a flow diagram of an example of a method for training a machine learning algorithm.

FIG. 2 illustrates a flow diagram of another example of a method for training a machine learning algorithm.

DESCRIPTION OF EXAMPLE EMBODIMENTS

Figure 3:
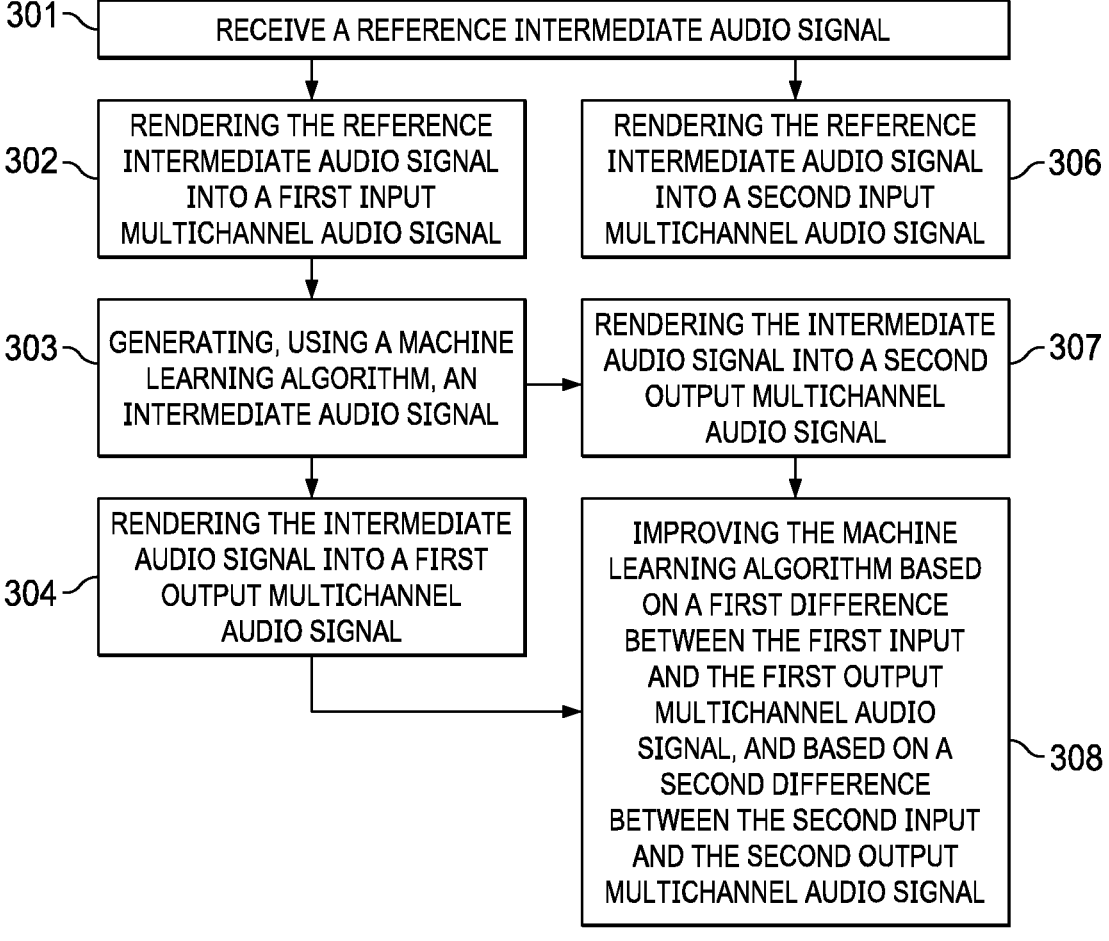
FIG. 3 illustrates a flow diagram of a further example of a method for training a machine learning algorithm.

Referring to the example of FIG. 1, a method for training a machine learning algorithm is illustrated. In step 101, a first input multichannel audio signal is received. For instance, the first input multichannel audio signal may comprise a 2.0, 3.1, 5.1 or 7.1 multichannel audio signal, also referred to as layout within this document. That is, the multichannel audio signal may correspond to a predefined speaker layout, such as a 2.0, 3.1, 5.1, or 7.1 speaker layout.

In step 102, a machine learning algorithm is used to generate an intermediate audio signal based on the first input multichannel audio signal. The machine learning algorithm may comprise a deep neural network such as e.g. a network based on the U-net architecture. The U-net architecture is described, for example, in O. Ronneberger, P. Fischer, T. Brox (2015), "U-Net: Convolutional Networks for Biomedical Image Segmentation", arXiv: 1505.04597 and builds upon a stack of convolutional layers organized in a contracting path and an expansive path. The contracting path follows the typical architecture of a convolutional network. It consists of the repeated application of convolutions, each followed by a rectified linear unit (ReLU) and a max pooling operation with an appropriate stride for down-sampling. At each down-sampling, the number of feature channels may be doubled. Every step in the expansive path may consist of an up-sampling of the feature map followed by a convolution that halves the number of feature channels, a concatenation with the correspondingly cropped feature map from the contracting path, and further convolutions, each followed by a ReLU.

The intermediate audio signal may comprise one or more audio objects, wherein each of the audio objects comprises an audio track and position metadata. For example, the intermediate audio format may comprise (e.g., relate to) a Dolby® Atmos™ format. Alternatively, the intermediate audio format may comprise (e.g., relate to) an Ambisonics audio format.

In step 103, the intermediate audio signal is rendered into a first output multichannel audio signal. This rendering step may involve a differentiable function. This may amount to rendering the first output multichannel signal to a predefined speaker layout. The first output multichannel audio signal may have the same format as the first input multichannel audio signal. Both may be multichannel audio signals obtained by rendering to a predefined (e.g., same) channel layout (or speaker layout). For instance, the first output multichannel audio signal may comprise (e.g., relate to) a 2.0, 3.1, 5.1, 7.1, 9.1, 5.1.2, 7.1.4, or 9.1.6 multichannel audio signal. As will be described below, the intermediate audio signal may also be rendered into more than one output multichannel audio signal in some implementations.

In step 104, the machine learning algorithm is improved based on a difference between the first input multichannel audio signal and the first output multichannel audio signal. More specifically, the machine learning algorithm may be trained using a back-propagation algorithm. In other words, the quality of the generated intermediate audio signal is evaluated indirectly by comparing two rendered layouts which may be actually perceived by human listener. This improvement may be done iteratively by repeatedly inputting the first input multichannel audio signal to the machine learning algorithm (e.g., to a deep neural network implementing the machine learning algorithm) and comparing the first input multichannel audio signal and the first output multichannel audio signal. As such, the improvement may correspond to iterative training of the machine learning algorithm. Improvement or training may involve backpropagation of (a gradient of) an error function (e.g., the aforementioned difference), as the skilled person will appreciate.

FIG. 2 illustrates a flow diagram of another example of a method for training a machine learning algorithm. In step 201, a reference intermediate audio signal is received, wherein said reference intermediate audio signal has the same format as the intermediate audio signal generated based on the first input multichannel audio signal. In step 202, the received reference intermediate audio signal is rendered into the first input multichannel audio signal. This may involve rendering the reference intermediate audio signal to a predefined channel (or speaker) layout. In step 203, a machine learning algorithm is used to generate an intermediate audio signal based on the first input multichannel audio signal. In step 204, the intermediate audio signal is rendered into a first output multichannel audio signal. This may involve rendering the generated intermediate audio signal to a predefined channel (or speaker) layout using one or more differentiable functions. In step 205, the machine learning algorithm is improved based on a difference between the first input multichannel audio signal and the first output multichannel audio signal. Therein, the rendering and the improvement (e.g., training) may proceed in analogy to what has been described in the context of FIG. 1.

FIG. 3 illustrates a flow diagram of a further example of a method for training a machine learning algorithm. In step 301, a reference intermediate audio signal is received. In step 302, the received reference intermediate audio signal is rendered into a first input multichannel audio signal. In step 306, the received reference intermediate audio signal is rendered into a second input multichannel audio signal. In step 303, a machine learning algorithm is used to generate an intermediate audio signal based on the first input multichannel audio signal. In step 304, the intermediate audio signal is rendered into a first output multichannel audio signal. In step 307, the intermediate audio signal is rendered into a second output multichannel audio signal. Again, both renderings in steps 304 and 307 may involve one or more dedicated differentiable functions. Finally, in step 308 the machine learning algorithm is improved based on (a) a first difference between the first input multichannel audio signal and the first output multichannel audio signal and based on (b) a second difference between the second input multichannel audio signal and the second output multichannel audio signal. Therein, the rendering and the improvement (e.g., training) may proceed in analogy to what has been described in the context of FIG. 1.

In the above, it is understood that more than two renderings of the reference intermediate audio signal and the intermediate audio signal may be generated and compared to each other. For instance, the reference intermediate audio signal and the intermediate audio signal may be rendered to two or more of a 2.0 multichannel audio format, a 5.1 multichannel audio format, a 7.1 multichannel audio format, and a 9.1 multichannel audio format. Respective results of comparisons (e.g., respective differences or loss functions) may be collectively used for improving (e.g., training) the machine learning algorithm, for example by taking a (weighted) sum of the individual differences or loss functions.

Architecture Design

Figure 4A:
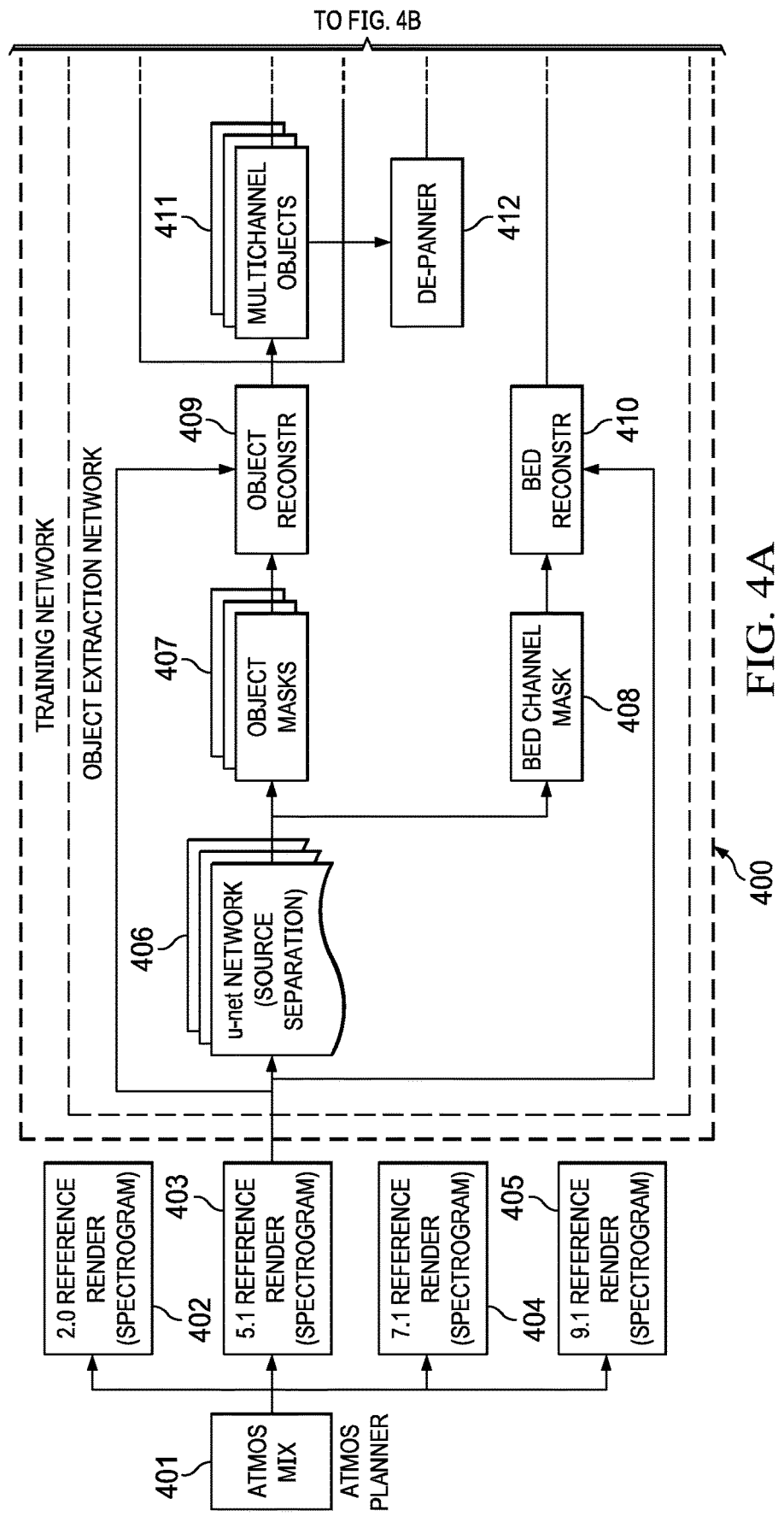
FIGS. 4A and 4B illustrate an example architecture for source separation based on deep learning.
Figure 4B:
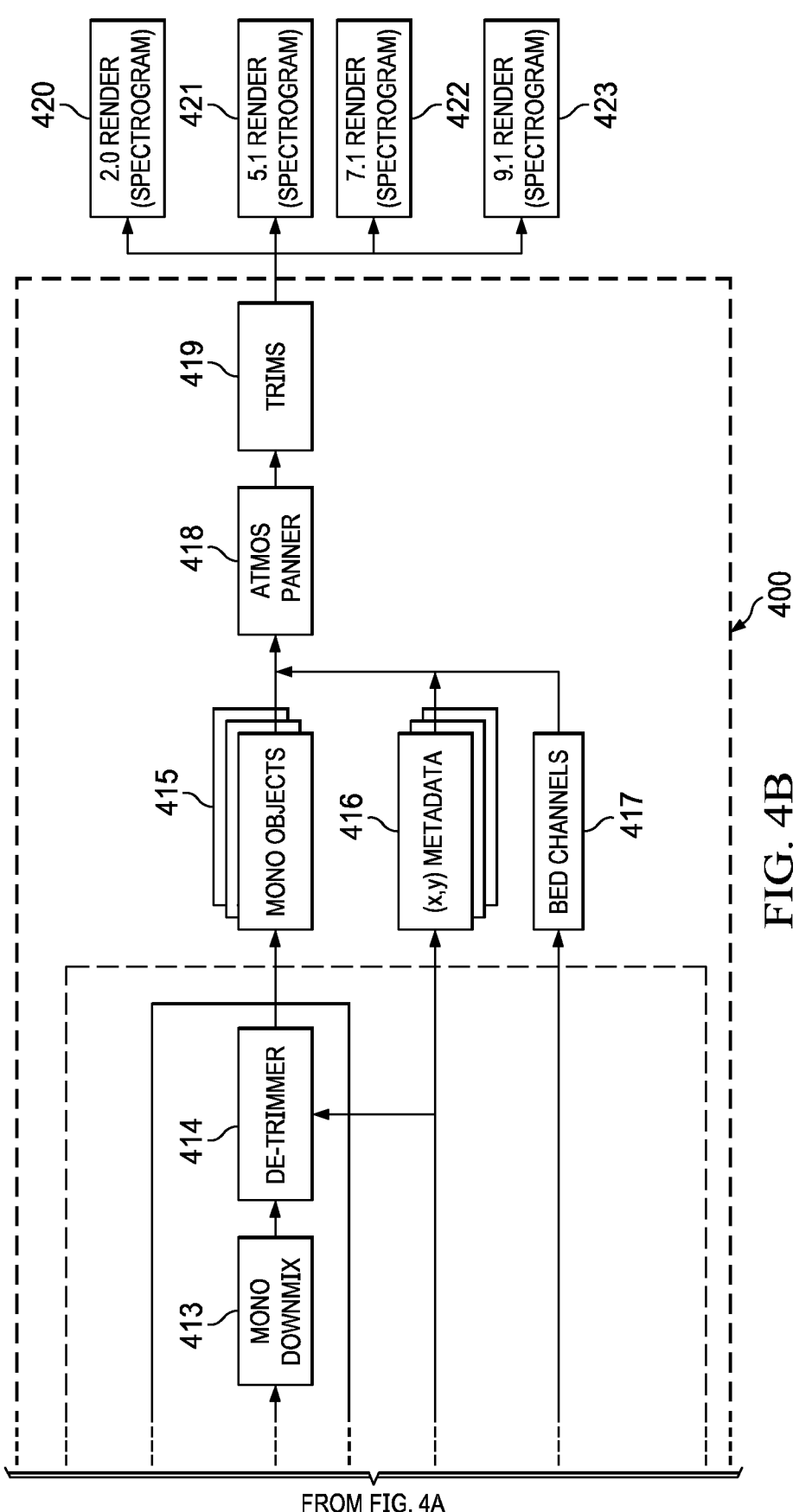

As already discussed in the forgoing description, it is one object of the disclosure to explore the possibility of automatically extracting objects e.g. from a 5.1 multichannel mix using deep learning techniques with the aim of converting legacy audio formats to the Dolby® Atmos™ audio format. FIG. 4A and FIG. 4B illustrate an exemplary architecture for source separation based on deep learning. All items inside the dashed box 400 may be running internally a deep neural network (DNN) and may be back-propagated. The number of objects and the specific layouts are only examples.

An Atmos mix 401 is rendered in a plurality of different multichannel layouts 402, 403, 404, 405. Based on these layouts, a core DNN 406 (e.g., based on U-net) generates both object masks 407 and a bed channel mask 408. These masks may relate to masks indicating certain time-frequency bins (e.g., FFT bins) of the respective audio signal or audio channel to belong to a given audio object or to the bed channel residual, respectively. The object masks subsequently undergo an objection reconstruction 409, resulting in a plurality of multichannel objects 411. Said multichannel objects relate to audio tracks of respective audio objects panned to the multichannel layout. They undergo monodownmixing and de-trimming 414 to obtain the actual mono objects 415. The de-trimmer 414 may be configured to increase a level of an object which is far from a screen. In this regard, de-trimming is regarded as the inverse function of trimming, which may involve applying a level decay to an object which is far from the screen. It should be noted that the mono objects 415 in FIG. 4A and FIG. 4B represent an example of the claimed audio tracks. Moreover, position metadata 416 is determined by de-panning 412 the multichannel objects 411. Meanwhile, the bed channels 417 are generated on a parallel processing path using bed channel reconstruction techniques 410 based on the bed channel mask 408. The mono objects 415, the position metadata 416, and the bed channels 417 may be seen as an example representation of the claimed audio objects. Subsequently, the mono objects 415, the position metadata 416, and the bed channels 417 are processed by an Atmos panner 418 and are trimmed 419 with regard to a third-dimension (i.e. with regard to a distance to the screen) to obtain the multichannel layouts 420, 421, 422, 423. As already discussed in the foregoing description, within this document, trimming may involve applying a level decay to an object which is far from the screen. These multichannel layouts 420, 421, 422, 423 may then be compared either individually or jointly (e.g., using appropriate weighting factors) to the original multichannel layouts 402, 403, 404, 405 for improving/optimizing the core DNN 406. Optionally, the de-panner 412 may comprise another neural network which is jointly improved/optimized together with the core DNN 406.

In general, the output 415, 416 is an Atmos mix with N objects (e.g., N=3) with corresponding position metadata. It can be understood as a mixed classification-regression problem. Every time-frequency bin may be classified (using e.g. a soft max layer) into any of the objects, or the bed channel. The position for each one of the objects may be regressed. The Atmos representation may be reconstructed by applying the results of the classification as a Wiener filter (soft mask). Also, for training, the different renders to different layouts may be generated (e.g. 2.0, 5.1, 7.1, 9.1) as part of the cost function calculation.

Network Structure

There may be three networks embedded one into each other. Firstly, the inner network may be a neural network such as a U-net, and it is trainable. Secondly, the intermediate network may be the object extraction network (or object extraction module) which wraps-up the neural network (e.g., U-net) with several non-trainable modules, the most important of which are the de-panner 412 and a de-trimmer 414. This network generates the Atmos mix. And thirdly, the outer network is the training network (or training module), only used for training. It renders the generated Atmos mix into the different layouts. The additional processing blocks introduced by the outer network may be non-trainable. In some implementations, also the de-panner 412 may be implemented by a trainable neural network.

Loss Function

The loss function may involve computing the renders to different layouts (e.g., 5.1, 7.1, 2.1) and comparing the renders with the reference renders using some loss function (e.g., mean squared error). Computing the renders to different layouts may be non-trivial because it requires implementing the Atmos panner in a tensor-differentiable form so that it can be back-propagated. This is the reason for the above-described training network.

Additionally, there may be the following penalties, wherein not all of them need to be active: a bed channel reminder (to avoid trivial solution of bypassing object extraction), a penalty for objects close to the 5.1 channel positions (to avoid objects close to 5.1 channels), a penalty for slowly moving objects (to avoid static objects), a penalty for very rapidly accelerating objects (to avoid "jumpy" objects), for objects beyond the first one, a penalty increasing for every additional object (dynamic object creation), a penalty for correlation between object content and bed channel reminder (to avoid bed channels and object having similar content), a penalty for correlated object content (to avoid objects sharing similar content), a penalty for correlated object trajectories (to avoid parallel moving objects). All penalties may be associated with a penalty pre-factor. Penalties with a penalty pre-factor equal to zero may be de-activated. Penalty pre-factors may be considered network hyper-parameters that need to be optimized.

Implementing some of these penalties may involve determining correlations between audio tracks of two different audio objects and/or determining correlations between the audio tracks of audio objects and the bed channel residual.

Training Modes

Figure 5:
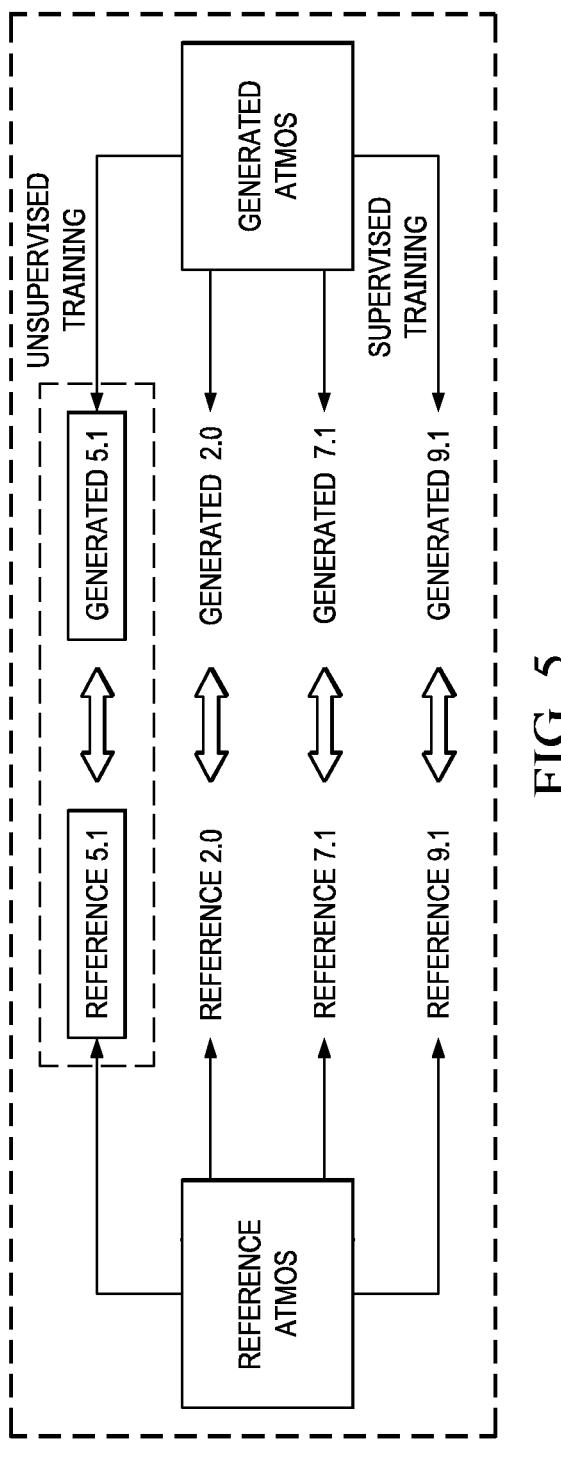
FIG. 5 illustrates different exemplary training modes.

The network can be trained in different ways. FIG. 5 illustrates different exemplary training modes. A first training mode is denoted supervised training mode. In this training mode, an Atmos training database may be needed. The training network (see e.g. box 400 in FIG. 4A and FIG. 4B) is based on the rendering to a set of pre-defined layouts (e.g., 2.0, 5.1, 7.1, 9.1). The input to the training network may be a list of reference renders to the set of pre-defined layouts. The output of the training network may be a list of renders to the same pre-defined layouts. The loss function may be based on the comparison between the two lists of renders, in addition to the penalties described above.

A second training mode is denoted unsupervised training mode. In this training mode, an Atmos training database may be not needed. The training network (see e.g. box 400 in FIG. 4) may be based on the rendering to the 5.1 layout only. The input of the training network may be the 5.1 reference render. The output of the training network may be a 5.1 render. The loss function may be based on the comparison of the two 5.1 renders only, in addition to the penalties described above. Therefore, in the unsupervised training mode, the training network has the form of an auto-encoder, going from a 5.1 render to a 5.1 render. The unsupervised training mode has an additional possibility: the network can be custom-trained for every particular piece of content.

By combining the two training modes above, there are several possibilities for training the network: Supervised training with an Atmos database; unsupervised training with a 5.1 database; unsupervised training with a single 5.1 excerpt; supervised training with an Atmos database, followed by an unsupervised refinement train to a single 5.1 excerpt; and unsupervised with a 5.1 database, followed by an unsupervised refinement train to a single 5.1 excerpt.

Network Variations

The network may be trained not only with planar layouts, but also with layouts having height channels such as 5.1.2, 5.1.4, 7.1.4. and 9.1.6. The bed reconstruction module may have a trainable up-mixer module that converts the input 5.1 residual into a 7.1.2 bed channel. As already mentioned, the de-panner module may also be trainable, or has a trainable part, and is able to generate height metadata z in addition to x and y metadata. The input channel could be any of 2.0 or 7.1 instead of 5.1. In the case of 2.0 input, the de-panner module should be trainable to generate y metadata from the 2.0 mix.

Interpretation

Unless specifically stated otherwise, as apparent from the following discussions, it is appreciated that throughout the disclosure discussions utilizing terms such as "processing," "computing," "calculating," "determining", "analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Aspects and implementations of the present disclosure will also become apparent from the below enumerated example embodiments (EEEs), which are not claims.

EEE 1. A method (e.g., computer-implemented method) for training a machine learning algorithm, the method comprising:
 receiving a first input multichannel audio signal,
 generating, using the machine learning algorithm, an intermediate audio signal based on the first input multichannel audio signal,
 rendering the intermediate audio signal into a first output multichannel audio signal, and
 improving the machine learning algorithm based on a difference between the first input multichannel audio signal and the first output multichannel audio signal.

EEE 2. The method according to EEE 1, wherein the receiving comprises
 receiving a reference intermediate audio signal, and
 rendering the reference intermediate audio signal into the first input multichannel audio signal.

EEE 3. The method according to EEE 1 or 2, wherein the reference intermediate audio signal has the same format as the intermediate audio signal.

EEE 4. The method according to any one of the preceding EEEs, wherein the first input multichannel audio signal has the same format as the first output multichannel audio signal.

EEE 5. The method according to any one of the preceding EEEs, wherein improving the machine learning algorithm includes comparing the first input multichannel audio signal and the first output multichannel audio signal using a loss function.

EEE 6. The method according to any one of the preceding EEEs, wherein the intermediate audio signal comprises one or more audio objects, wherein each of the audio objects comprises an audio track and position metadata.

EEE 7. The method according to EEE 6, wherein the intermediate audio signal further comprises a bed channel residual, wherein the bed channel residual is a multichannel audio signal having the same format as the first input multichannel audio signal.

EEE 8. The method according to any one of the preceding EEEs, wherein the first input multichannel audio signal comprises a 2.0, 3.1, 5.1 or 7.1 multichannel audio signal, and the first output multichannel audio signal comprises a 2.0, 3.1, 5.1, 7.1, 9.1, 5.1.2, 7.1.4, or 9.1.6 multichannel audio signal.

EEE 9. The method according to EEE 2 or any EEE referring to EEE 2, further comprising:
 rendering a second input multichannel audio signal from the reference intermediate audio signal,
 rendering the intermediate audio signal into a second output multichannel audio signal,
 improving the machine learning algorithm based a first difference between the first input multichannel audio signal and the first output multichannel audio signal, and based on a second difference between the second input multichannel audio signal and the second output multichannel audio signal.

EEE 10. The method according to EEE 9, wherein the second input multichannel audio signal has the same format as the second output multichannel audio signal.

EEE 11. The method according to any one of the preceding EEEs, wherein generating the intermediate audio signal using the machine learning algorithm further comprises
 generating, using the machine learning algorithm, a multichannel object based on the first input multichannel audio signal, and determining, using a de-panning algorithm, position meta data of an audio object of the intermediate audio signal based on the multichannel object.

EEE 12. The method according to EEE 11, wherein the de-panning algorithm is based on a further machine learning algorithm, and the method further comprises:

jointly improving the de-panning algorithm and the machine learning algorithm based on the difference between the first input multichannel audio signal and the first output multichannel audio signal.

EEE 13. The method according to any one of the preceding EEEs, wherein the machine learning algorithm comprises a deep neural network.

EEE 14. The method according to any one of EEEs 1 to 12, wherein the machine learning algorithm comprises a combination of a deep neural network and a digital signal processing algorithm.

EEE 15. The method according to EEE 5 or any EEE referring to EEE 5, wherein the comparing of the first input multichannel audio signal and the first output multichannel audio signal is performed in the waveform domain or in the spectrogram domain.

EEE 16. The method according to EEE 5 or any EEE referring to EEE 5, wherein the comparing of the first input multichannel audio signal and the first output multichannel audio signal involves at least one of: a mean squared error, a mean absolute error, and a mean squared logarithmic error.

EEE 17. The method according to EEE 6 or any EEE referring to EEE 6, wherein the improving further comprises minimizing a cost function term involving a position, a motion, or an acceleration of an audio object.

EEE 18. The method according to EEE 7 or any EEE referring to EEE 7, wherein the improving further comprises minimizing a cost function term involving a correlation between audio tracks of two different audio objects and/or between the audio track of an audio object and the bed channel residual.

EEE 19. Apparatus for generating an intermediate audio format from an input multichannel audio signal, wherein the apparatus includes a processor configured to perform the steps of the method according to any one of EEEs 1 to 18.

EEE 20. A computer program product comprising a computer-readable storage medium with instructions adapted to cause the device to carry out the method according to any one of EEEs 1 to 18 when executed by a device having processing capability.

The invention claimed is:

1. A computer-implemented method for training a machine learning algorithm, the method comprising:

receiving a first input multichannel audio signal, generating, using the machine learning algorithm, an intermediate audio signal based on the first input multichannel audio signal, wherein the intermediate audio signal comprises one or more audio objects, and wherein each of the audio objects comprises an audio track and position metadata, rendering the intermediate audio signal into a first output multichannel audio signal, and improving the machine learning algorithm based on a difference between the first input multichannel audio signal and the first output multichannel audio signal.

2. The method according to claim 1, wherein the receiving comprises:

receiving a reference intermediate audio signal, and rendering the reference intermediate audio signal into the first input multichannel audio signal.

3. The method according to claim 2, wherein the reference intermediate audio signal has the same format as the intermediate audio signal.

4. The method according to claim 2, wherein the reference intermediate audio signal comprises one or more audio objects.

5. The method according to claim 4, wherein the intermediate audio signal further comprises a bed channel residual, wherein the bed channel residual is a multichannel audio signal having the same format as the first input multichannel audio signal, and wherein the number of audio objects of the reference intermediate audio signal is larger than the number of audio objects of the intermediate audio signal.

6. The method according to claim 2, further comprising:

rendering a second input multichannel audio signal from the reference intermediate audio signal, rendering the intermediate audio signal into a second output multichannel audio signal, and improving the machine learning algorithm based a first difference between the first input multichannel audio signal and the first output multichannel audio signal, and based on a second difference between the second input multichannel audio signal and the second output multichannel audio signal.

7. The method according to claim 6, wherein the second input multichannel audio signal has the same format as the second output multichannel audio signal.

8. The method according to claim 1, wherein the first input multichannel audio signal has the same format as the first output multichannel audio signal.

9. The method according to claim 1, wherein improving the machine learning algorithm includes comparing the first input multichannel audio signal and the first output multichannel audio signal using a loss function.

10. The method according to claim 9, wherein the comparing of the first input multichannel audio signal and the first output multichannel audio signal is performed in the waveform domain or in the spectrogram domain.

11. The method according to claim 9, wherein the comparing of the first input multichannel audio signal and the first output multichannel audio signal involves at least one of: a mean squared error, a mean absolute error, and a mean squared logarithmic error.

12. The method according to claim 1, wherein the intermediate audio signal further comprises a bed channel residual, wherein the bed channel residual is a multichannel audio signal having the same format as the first input multichannel audio signal.

13. The method according to claim 12, wherein the improving further comprises minimizing a cost function term involving a correlation between audio tracks of two different audio objects and/or between the audio track of an audio object and the bed channel residual.

14. The method according to claim 1, wherein the first input multichannel audio signal comprises a 2.0, 3.1, 5.1 or 7.1 multichannel audio signal, and the first output multichannel audio signal comprises a 2.0, 3.1, 5.1, 7.1, 9.1, 5.1.2, 7.1.4, or 9.1.6 multichannel audio signal.

15. The method according to claim 1, wherein generating the intermediate audio signal using the machine learning algorithm further comprises:

generating, using the machine learning algorithm, a multichannel object based on the first input multichannel audio signal, and determining, using a de-panning algorithm, position meta data of an audio object of the intermediate audio signal based on the multichannel object.

16. The method according to claim 15, wherein the de-panning algorithm is based on a further machine learning algorithm, and the method further comprises:

jointly improving the de-panning algorithm and the machine learning algorithm based on the difference between the first input multichannel audio signal and the first output multichannel audio signal.

17. The method according to claim 1, wherein the machine learning algorithm comprises a deep neural network or a combination of a deep neural network and a digital signal processing algorithm.

18. The method according to claim 1, wherein the improving further comprises minimizing a cost function term involving a position, a motion, or an acceleration of an audio object.

19. Apparatus for generating an intermediate audio format from an input multichannel audio signal, wherein the apparatus includes a processor configured to perform the steps of the method according to claim 1.

20. A computer program product comprising a non-transitory computer-readable storage medium with instructions adapted to cause a device to carry out the method according to claim 1 when executed by the device having processing capability.

\* \* \* \* \*